United States Patent [19]
Goldie

[11] 3,985,241
[45] Oct. 12, 1976

[54] TRANSFER AND PILING OR STACKING MACHINE FOR LENGTHS OF FERROMAGNETIC MATERIAL

[75] Inventor: William Law Goldie, Glasgow, Scotland

[73] Assignees: British Steel Corporation, London, England; Lamberton and Company Limited, Coatbridge, Scotland

[22] Filed: Jan. 14, 1975

[21] Appl. No.: 540,983

[30] Foreign Application Priority Data
Jan. 22, 1974 United Kingdom.............. 2840/74

[52] U.S. Cl. .............................. 214/6 FS; 198/773; 214/1 QG; 214/6.5
[51] Int. Cl.² .................. B65G 57/04; B65G 57/18
[58] Field of Search ............... 214/6 FS, 6 DS, 6 W, 214/6.5, 152, 1 QG; 198/41, 107, 210, 219, DIG. 13

[56] References Cited
UNITED STATES PATENTS

| | | | |
|---|---|---|---|
| 2,559,460 | 7/1951 | Peterson............................ | 214/6 FS |
| 3,161,284 | 12/1964 | Ashworth........................... | 198/219 |
| 3,749,256 | 7/1973 | Hill et al............................ | 214/6 FS X |
| 3,871,533 | 3/1975 | Mulchahy........................... | 214/6 FS |
| 3,920,132 | 11/1975 | Cleland et al..................... | 214/6 DS |

FOREIGN PATENTS OR APPLICATIONS

| | | | |
|---|---|---|---|
| 1,186,408 | 1/1965 | Germany........................... | 214/6 FS |
| 1,183,020 | 12/1964 | Germany........................... | 214/6 FS |

Primary Examiner—L. J. Paperner
Attorney, Agent, or Firm—Bacon & Thomas

[57] ABSTRACT

A transfer and piling or stacking machine for accepting rolled lengths of ferromagnetic material, e.g. steel billets or sections, moving laterally, e.g. sideways from a roller table, loading them crosswise on a conveyor conveying them to, and depositing them on, the pole pieces of an electromagnet rotatably mounted about its horizontal core as axis, and rotating the electromagnet to deposit the lengths of ferromagnetic material in a pile or stack, is improved by using as the conveyor a support element which can be moved independently (a) from the loading point for the ferromagnetic material to the electromagnet, and (b) upwardly and downwardly relative the loading point and the electromagnet. This is suitably accomplished by incorporating the support element in a carriage which runs horizontally in a track extending between the loading point and the electromagnet, the track being able to be raised and lowered with the carriage which it carries.

5 Claims, 1 Drawing Figure

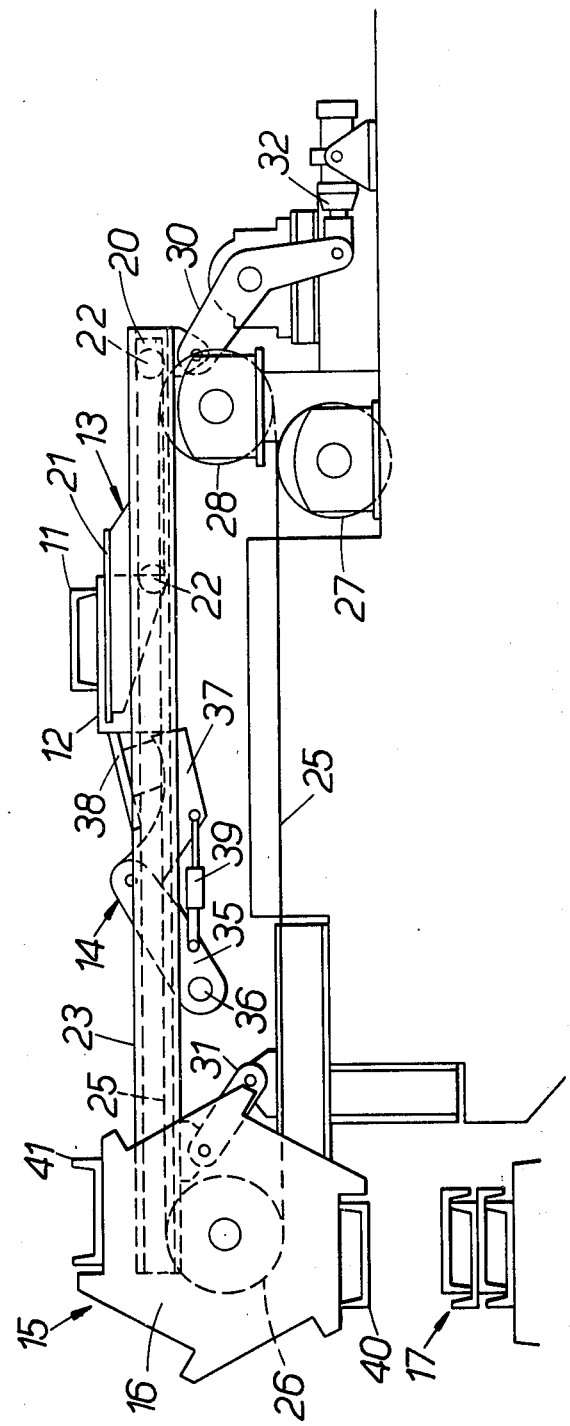

TRANSFER AND PILING OR STACKING MACHINE FOR LENGTHS OF FERROMAGNETIC MATERIAL

This invention relates to a materials handling device in particular to a device for handling lengths of ferromagnetic material such as rolled steel sections and forming them into piles. The invention is an improvement in or modification, of the invention described and claimed in our U.S. Pat. No. 3,920,132.

In a steel mill producing lengths of steel, for example rolled sections, it becomes necessary to pile and stack the sections so that they can be bundled for despatch. It may also be necessary to sort the sections into different stacks before bundling so that each bundle will consist for example of sections of the same length, or of sections for one customer.

The term "pile" is used herein to denote a plurality of lengths of material resting one on another, and the term "stack" to denote two or more piles placed side by side.

The specification in respect of U.S. Pat. No. 3,920,132 describes and claims apparatus for piling lengths of ferromagnetic material, which apparatus comprises a conveyor moveable from a loading station to an unloading station, means at the loading station for loading a length of ferromagnetic material crosswise on to the conveyor, a rotatable electromagnet at the unloading station adpated to accept from the conveyor and magnetically hold the length of ferromagnetic material, means for rotating the electromagnet and held ferromagnetic material to an orientation in which the ferromagnetic material is immediately above a receiving surface, and means for deactivating the electromagnet in that orientation to release the length of ferromagnetic material and deposit it on to the receiving surface.

That specification also describes and claims a method of piling lengths of ferromagnetic material, which method comprises loading a length of ferromagnetic material crosswise on to a conveyor at a loading station, moving the length of material on the conveyor to an unloading station, transferring the length of material to an electromagnet and magnetically holding it thereon, rotating the electromagnet and held ferromagnetic material to an orientation in which the ferromagnetic material is immediately above a receiving surface, and deactivating the electromagnet to release the length of ferromagnetic material and deposit it on the receiving surface.

The receiving surface will, except in the first cycle of operations, normally be a length of ferromagnetic material deposited in the preceding cycle. The deposition of successive lengths allows the formation of a pile. Gradual lowering of the base of the pile, for example by the thickness of one length of the ferromagnetic material each time a further length is deposited, may be employed to maintain a receiving surface in substantially the same position at the top of the pile.

As each pile is formed it may be removed and brought together with other piles to form a stack, which can then be bundled in the usual way.

The conveyor specifically disclosed and described in that specification is an endless belt.

In accordance with the present invention the conveyor comprises a support element adapted to substantially independent movement (a) from the loading station to the unloading station and (b) upwardly and downwardly relative to the loading and unloading stations. Such a conveyor will hereinafter be referred to as a lifting carriage.

It is preferred that the loading and unloading stations each comprise a support surface capable of being held stationary in a predetermined position, and that the limits of the upward and downward movement of the support element on the lifting carriage at the loading and unloading stations are respectively above and below the support surfaces in those predetermined positions.

In the method of the invention the step of loading a length of ferromagnetic material crosswise on to a conveyor at a loading station is then carried out by supporting the length of material on the stationary support surface at the loading station and raising the support element of the lifting carriage under the length of material until the material is raised from the support surface. The step of transferring the length of material to an electromagnet is carried out by lowering the support element of the lifting carriage at the unloading station until the length of material is deposited on the stationary support surface at the unloading station. This will normally be the electromagnet, although it may possibly be an intermediate handling device to transfer the material to the electromagnet.

The conveyor may comprise two or more laterally spaced lifting carriages adapted to run parallel to each other, and coupled together so that they move in concert. Such an arrangement facilitates the conveying of particularly long material.

The lifting carriage may suitably be drivable along a track extending between the unloading and the loading stations. The support element may be capable of moving upwardly or downwardly relative to the rest of the lifting carriage on a fixed track, or alternatively the track itself may be capable of being raised and lowered relative to the loading and unloading stations.

The advantages given by the present invention as compared with the invention as specifically described in our previous application lie in the ability to reduce wear and to provide precise control more simply. When an endless belt is used as the conveyor precise location of the ferromagnetic material is normally achieved by the use of stops to arrest the motion of the ferromagnetic material while permitting the belt to continue moving, and associated with the endless belt and the stops are limit switches which sense the position of the material.

It is therefore necessary that the length of the ferromagnetic material should slide over the surface of the belt and a consequence of this is that the material of the belt become worn.

When the lifting carriage is used in accordance with the present invention the requirement for the ferromagnetic material to slide over the surface of the conveyor is considerably reduced. By the use of a lifting carriage movable along a track it is also possible to achieve control of the position of the length of material by the precise control of the drive to the lifting carriage.

In the practice of this invention, the lifting carriage in a lowered position is run under a length of ferromagnetic material at the loading station. The lifting carriage is then raised to take up the length of material, and is then driven along the track to the unloading station. At this point the length of material is held above the rotatable electromagnetic. The lifting carriage is then lowered until the length of material is deposited on the rotatable electromagnet, after which the normal sequence of handling the material continues. The lifting carriage is meanwhile run back to an ambush position at the loading station.

The apparatus of the invention may also include means for inverting selected lengths of ferromagnetic material with respect to other lengths of the material. Some rolled steel sections, for example channel sections, require to be piled with every alternative section inverted to give a compact and stable pile. Such means may suitably be provided between the loading and unloading stations. When it is intended to invert a particular length of material the lifting carriage is halted between the loading and unloading stations to allow inversion to take place.

The rotatable electromagnet may with advantage be as described in the specification in respect of U.S. Pat. No. 3,920,132. Such an electromagnet has a core wound with a coil and is provided with means for connecting the coil to a d.c. electrical power source, the core carrying at least two pole pieces extending radially beyond the wound core and provided with edge profiling adapted to receive a length of ferromagnetic material bridging the pole pieces, the electromagnet being mounted for axial rotation about the core on bearings in a frame.

One embodiment of the invention is shown by way of example in side elevation in the accompanying drawing, which essentially illustrates the conveyor and associated equipment differing from that specifically described in the specification in respect of U.S. Pat. No. 3,920,132.

Rolled steel sections, a channel section 11 being illustrated, are delivered along a roller table of which one roller 12 is shown. Each section is picked up from the roller table by a lifting carriage 13, may optionally be inverted by a turnover device 14, and is deposited on a rotatable electromagnet 15, in a manner to be subsequently described.

The electromagnet 15 is rotated carrying the rolled section across its pole pieces 16 until the section is above a pile of previously handled sections 17, to which the section is added by de-activating the electromagnet.

The lifting carriage 13 comprises a wheeled trolley 20 having a raised platform 21 at its forward end for carrying the rolled steel sections. The trolley wheels 22 run inside a pair of parallel inwardly facing channel section beams which extend from behind the roller table to between the pole pieces 16 of the rotatable electromagnet. These beams thus define a track 23 for the lifting carriage 13 between loading and unloading stations.

The lifting carriage can be moved along this track by an endless driving rope or chain 25 which is fixedly attached to the trolley 20. The driving rope or chain passes from the trolley forward around a pulley 26 coaxial with the rotatable electromagnet 15, back to and around a motor driven pulley drum 27, around a pulley 28 situated towards the rearward end of the beams 23 and forwards to the trolley. The position of the trolley on the track can thus be controlled by rotation of the motor driven pulley drum 27.

The trolley can also be moved upwardly and downwardly. This is accomplished by vertical displacement of the track in which it runs. The mechanism for doing this also incidentally gives a simultaneous small horizontal displacement to the track, but not to the trolley which is held in position by the horizontal rope or chain 25. The mechanism comprises a pivoted bell-crank 30 supporting the rearward end of the track and a corresponding pivoted idler arm 31 supporting the forward end of the track. The free end of the bell-crank is connected to a hydraulic piston and cylinder assembly 32, extension of which raises the track and retraction of which lowers the track. The turnover device 14 comprises an arm 35 fixed at the end on an axle 36 which can be rotated to and fro by a suitable drive unit. The arm 35 carries pivoted on its other end a further cranked arm 37 which in turn carries an electromagnet having a faceplate 38. The arms 35 and 37 are linked by a hydraulic piston and cylinder assembly 39 which controls the articulation of the two arms. The turnover device is offset to one side of the track so that it does not interfere with the motion of the lifting carriage 13.

When the rolled section 11 is ready for removal from the roller table and transport to the pile 17, the lifting carriage is first moved to its starting position at the rearward end of the track 23. The track is then raised by extension of the piston and cylinder assembly 32 until the platform 21 on the trolley 20 has lifted the rolled section free of the roller table. The pulley drum 27 is then rotated to pull the lifting carriage forwards carrying the section. If it is not intended to invert the section before loading it on to the electromagnet 15 the lifting carriage is run forwards to a position at which the section 11 is immediately above the uppermost pair of flat edges of the pole pieces 16 of the rotatable electromagnet 15. The track 23 is then lowered to drop the lifting carriage platform 21 and transfer the section to the electromagnet 15. The lifting carriage can then be run back to its starting position while the electromagnet 15 is rotated to transfer the section to the pile 17. The section shown at 40 is being handled in this way and was not inverted before transfer to the rotatable electromagnet.

In the case of a section which is to be inverted the turnover device 14 is used. The lifting carriage, after having picked up the section from the roller table, is run forward only so far as to bring the section to a position overlying the electromagnetic faceplate 38 of the turnover device, after which the track 23 can be lowered and the lifting carriage run back to its starting position. The section is meanwhile transferred directly to the rotatable electromagnet 15 by the turnover device. The arm 35 is rotated on its axle 36 and simultaneously the piston and cylinder assembly 39 is extended to bring the faceplate 38 horizontally over the uppermost pair of flat edges of the pole pieces 16 while magnetically holding the rolled section. The electromagnet on the arm 37 of the turnover device is then de-activated to release the rolled section and deposit it at 41 on the rotatable electromagnet 15. The turnover device is then returned to its ambush position by reverse operation of the axle 36 and piston and cylinder asembly 39 while the section at 41 is piled as before.

In order to ease the handling of relatively long rolled sections there will normally be at least two tracks 23, each with its own lifting carriage 13, operating synchronously and arranged parallel to each other but spaced apart laterally. Similarly, two or more turnover devices 14 and rotatable electromagnets 15 may be provided. A similar arrangement is specifically described in the specification in respect of U.S. Pat. No. 3,920,132.

Position control and sequential operation of the several elements of the apparatus can be accomplished in any convenient way. Thus limit switches may be used to detect the arrival of the rolled section at any position and to stop one operation and/or start another. Similar detection devices may be associated with the drive to elements such as the lifting carriage 13, turnover device 14 and rotatable electromagnet 15 in order to control their operation directly.

We claim:

1. Apparatus for piling lengths of ferromagnetic material, which apparatus comprises a conveyor movable from a loading station to an unloading station, means at the loading station for loading a length of ferromagnetic material crosswise on to the conveyor, a rotatable electromagnet at the unloading station having a plurality of circumferentially spaced receiving positions adapted to be sequentially presented to the conveyor on rotation of the electromagnet for supporting a length of the ferromagnetic material, each receiving position being provided with a locating stop for a length of ferromagnetic material and adapted to accept directly from the conveyor and magnetically hold the length of ferromagnetic material, means for rotating the electromagnet and held ferromagnetic material to an orientation in which the ferromagnetic material is immediately above a receiving surface, and means for deactivating the electromagnet in that orientation to release the length of ferromagnetic material and deposit it on to the receiving surface, wherein the conveyor comprises a support element adapted to substantially independent movement (a) from the loading station to the unloading station and (b) upwardly and downwardly relative to the loading and unloading stations, the loading and unloading stations each comprising a support surface capable of being held stationary in a predetermined position, and the limit of the upward and downward movements of the support element on the conveyor at the loading and unloading stations are respectively above and below the support surface in the predetermined positions.

2. Apparatus according to claim 1 wherein the conveyor is drivable along a track extending between the loading and the unloading stations.

3. Apparatus according to claim 2 wherein the track is capable of being raised and lowered relative to the loading and unloading stations.

4. Apparatus according to claim 2 wherein the track comprises a pair of parallel inwardly facing channel section beams.

5. Apparatus according to claim 1 wherein the conveyor comprises a wheeled trolley having a raised platform constituting the support element.

* * * * *